United States Patent [19]
Reboux

[11] Patent Number: 5,158,250
[45] Date of Patent: Oct. 27, 1992

[54] SPIN-STABILIZED ARTIFICIAL SATELLITE WITH PASSIVE COMPENSATION OF SOLAR RADIATION PRESSURE

[75] Inventor: Alain Reboux, Fayence, France

[73] Assignee: Aerospatiale Societe Nationale Industrielle, Paris, France

[21] Appl. No.: 734,516

[22] Filed: Jul. 23, 1991

[30] Foreign Application Priority Data

Jul. 31, 1990 [FR] France .................................. 90 09764

[51] Int. Cl.⁵ .......................... B64G 1/32; B64G 1/44
[52] U.S. Cl. ................................... 244/166; 244/168; 136/244; 136/292; 136/293
[58] Field of Search .................... 244/166, 168, 173; 136/244, 292, 293

[56] References Cited

U.S. PATENT DOCUMENTS

| | | | |
|---|---|---|---|
| 3,367,605 | 2/1968 | Wanger | 244/166 |
| 3,390,848 | 7/1968 | Crocker et al. | 244/166 |
| 3,838,834 | 10/1974 | Michaelis | 244/166 |
| 4,732,354 | 3/1988 | Lievre | 244/170 |
| 4,949,922 | 8/1990 | Rosen | 244/168 |

FOREIGN PATENT DOCUMENTS 1468087 12/1966 France .................................. 244/166
2177364 10/1973 France .................................. 244/166

Primary Examiner—Aaron Weisstuch
Attorney, Agent, or Firm—Remy J. VanOphem

[57] ABSTRACT

A satellite adapted to be stabilized in terrestrial orbit by rotation about an axis oriented at least approximately NORTH-SOUTH has on its external wall a solar generator composed of a plurality of columns of solar cells divided into groups adapted to supply at least one given electrical voltage. In each of a plurality of groups equiangularly distributed in the circumferential direction, the cells straddle two columns electrically connected by at least two electrical connections forming with the group(s) to which the connection belong an electrical loop. The clockwise or counterclockwise direction of current flow is the same for least the majority of the electrical loops and is so chosen that, at any time, the loops which are illuminated at this time by the Sun, by virtue of interaction with the terrestrial magnetic field, produce a compensating torque in the opposite direction to the solar radiation pressure torque.

19 Claims, 4 Drawing Sheets

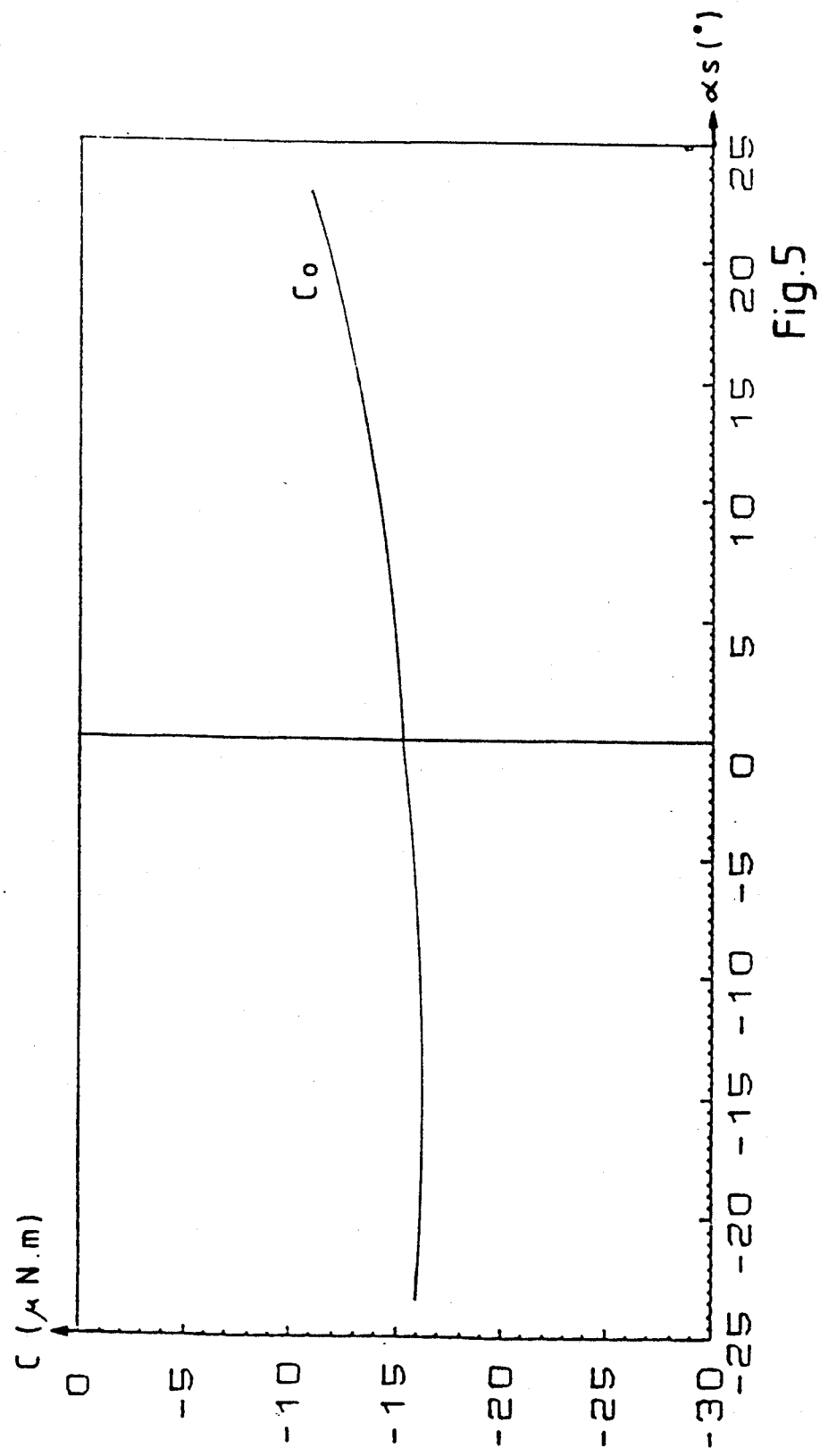

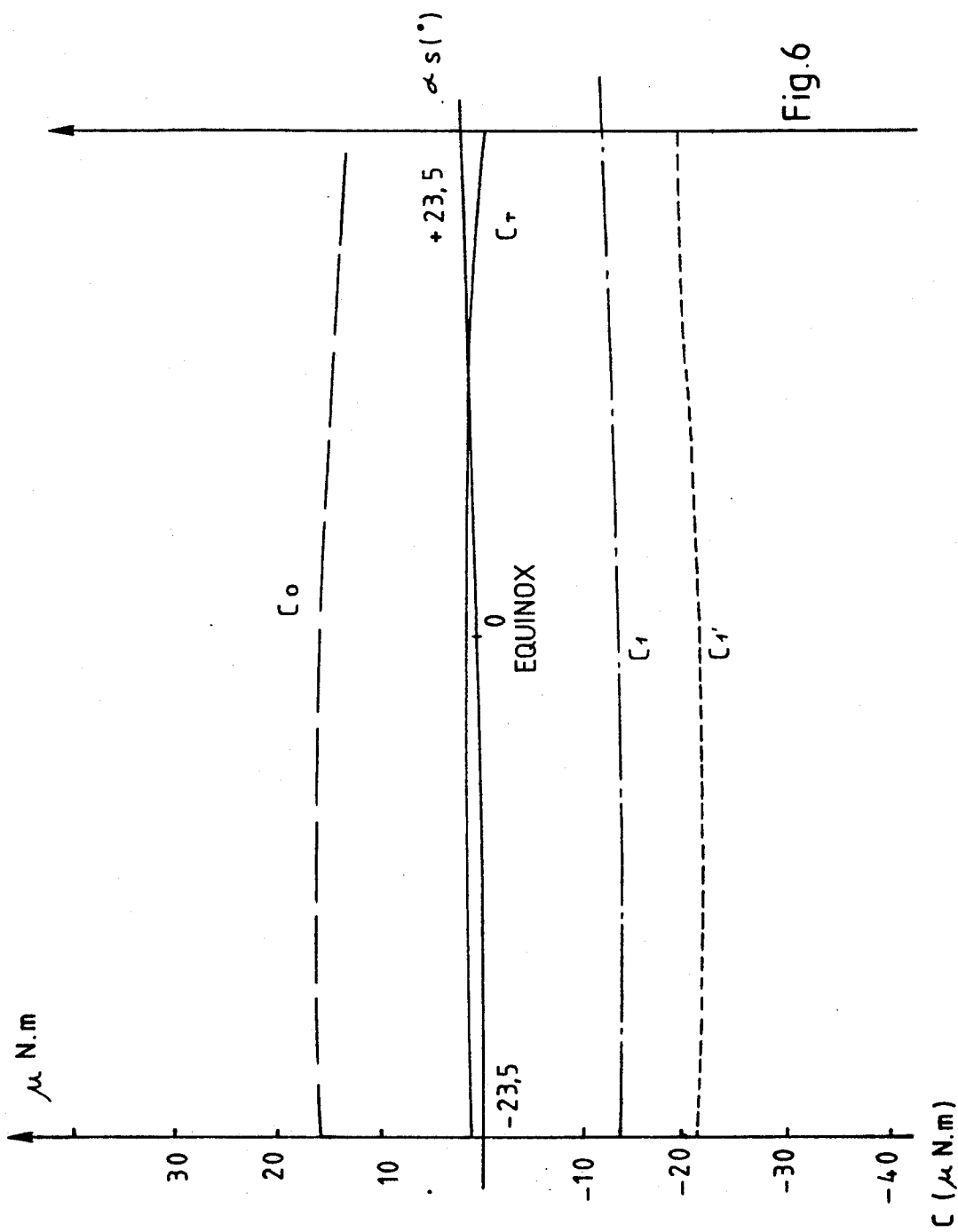

SPIN-STABILIZED ARTIFICIAL SATELLITE WITH PASSIVE COMPENSATION OF SOLAR RADIATION PRESSURE

BACKGROUND OF THE INVENTION

The invention concerns a satellite in terrestrial orbit whose attitude is stabilized by rotating the satellite about its own axis (sometimes called "spin-stabilized" satellite) and is directed to minimizing the sensitivity of satellites to some causes of external disturbance.

Any satellite is acted on by external disturbing forces due to its environments. The external forces include solar radiation pressure, gravity gradient, terrestrial magnetic field, and atmospheric drag, especially in low orbit.

In a geostationary orbit the solar radiation pressure is usually the predominant disturbance.

Non-coincidence of the center of mass of the satellite and the center of application of the external forces causes torques to be exerted on the satellite.

In an environment of this kind, the satellite is generally stabilized by producing a substantial kinetic moment, either by means of the rotation of the satellite about its own axis in the case of a spin-stabilized satellite, or by means of inertia wheels designed to create a kinetic moment by artificial means in the case of a "three axis stabilized" satellite.

Nevertheless, the effect of the applied external torques modifies the characteristics of the kinetic moment and in particular its direction, so that the attitude of the satellite is subject to drift.

To meet the satellite stability constraints relating to its mission, in particular pointing of antennas or observation instruments, compensation, known as "attitude control", must be applied using appropriate actuators such as gas jet thrusters and other devices.

In the case of a spin-stabilized satellite, it is not possible to use magnetic actuators because the direction of the kinetic moment created in this way would rotate with the satellite. Only abrupt action actuators can be used for spin-stabilized satellites; in practice gas jet thrusters.

Attitude control maneuvers are then accompanied by a temporary disturbance to the nominal attitude of the satellite and, therefore, an interruption in its mission. As these maneuvers must be carried out at regular intervals, they cause frequent interruptions of the mission. Also, the generation of the gas jets used for these maneuvers consumes propellants and this reduces the total life of the satellite.

An object of the invention is to alleviate the aforementioned disadvantages in relation to a spin-stabilized satellite, in particular where the latter is in an equatorial, preferably geostationery orbit, that is to say in a situation in which the external disturbances are due primarily to the solar radiation pressure (above "low" orbits, at an altitude of typically 20,000 to 40,000 km, for example).

SUMMARY OF THE INVENTION

The present invention is directed, on a spin-stabilized satellite, to compensating as fully as possible the disturbances due to the solar radiation pressure and to variations therein while minimizing the consumption of propellants and mission interruptions, without any significant increase in mass, overall dimensions or cost.

To this end, the invention proposes a satellite adapted to have its attitude in a terrestrial orbit stabilized by spinning about an axis oriented at least approximately NORTH-SOUTH, composed of a generally cylindrical external wall coaxial with the axis, and a solar generator constituting a plurality of columns of solar cells carried by the external wall parallel to and all around the axis. The cells are divided into groups of cells connected in series adapted to supply at least one given electrical voltage.

In each of a plurality of groups equi-angularly distributed in the circumferential direction, the cells connected in series straddle two columns. The two columns are electrically connected to each other by at least two electrical connections respectively denoted NORTH and SOUTH and having the same dimensions in the direction transverse to the axis, each belonging to one of the groups and forming with the group(s) to which the connections belong a discontinuous electrical loop allowing current to flow in a predetermined clockwise or counterclockwise direction when the cells of the loop are illuminated.

The predetermined clockwise or counterclockwise direction of current flow is the same for at least the majority of the electrical loops and is chosen so that, at any time, the loops illuminated by the Sun at this time, by virtue of interacting with the terrestrial magnetic field, produce a compensating torque about the instantaneous transverse axis of the satellite in the direction opposite to the instantaneous solar radiation pressure torque exerted on the satellite about the axis.

As a result of interaction with the terrestrial magnetic field, the solar energy is exploited to compensate, at least in part, the disturbing transverse torque resulting from the solar radiation pressure.

It will be understood that the invention assigns a dual role to the solar cells (generation and compensation) and that this goes against received wisdom in the art ruling out any looped "circuit" of the cells.

In what follows, an electrical loop, or current loop, is defined as an electrical circuit that is generally closed upon itself, continuous or otherwise and, therefore, formed by one or more groups, carrying currents flowing in the same clockwise or counterclockwise direction. The circuit includes at least two NORTH and SOUTH continuous transverse electrical links (or transverse runs) of the same dimensions transversely to the axis so that currents flow in them in opposite directions. It will be noted that it is not important for the longitudinal runs of the circuit to be continuous as they are in the same direction as the terrestrial magnetic field and, therefore, do not contribute to generating the compensating torque.

According to preferred features of the invention, some of which may possibly be combined the columns are connected only two electrical connections, each column is connected to only one other column, and the two columns are connected at their end cells by two electrical connections of the same length.

Each group of cells straddles two half-columns, the columns of cells connected in series are adjacent, the columns of cells connected in series are separated by at least one other column, the groups of cells thus forming interleaved loops, and the columns of cells extend over substantially all of the axial dimension of the generally cylindrical wall.

The plurality of groups may be composed of most of the groups of cells, at least approximately three quarters of the groups of cells, or at least approximately nine tenths of the groups of cells.

According to a further feature of the invention, the predetermined clockwise or counterclockwise direction of the current flow is the same for at least most of the loops, at least approximately three quarters of the loops, or at least approximately nine tenths of the loops.

Objects, features and advantages of the invention will emerge from the following description given by way of non-limiting example taken in conjunction with the drawings appended hereto.

BRIEF DESCRIPTION OF THE DRAWINGS

FIG. 5 is a graph showing the variation in the solar torque with the angle of incidence, that is to say between two solstices (winter and summer); and FIG. 6 is a graph showing the variations in the solar torque, the compensating torque and the residual torque over the same period.

DETAILED DESCRIPTION OF THE PREFERRED EMBODIMENT

Figure 1:
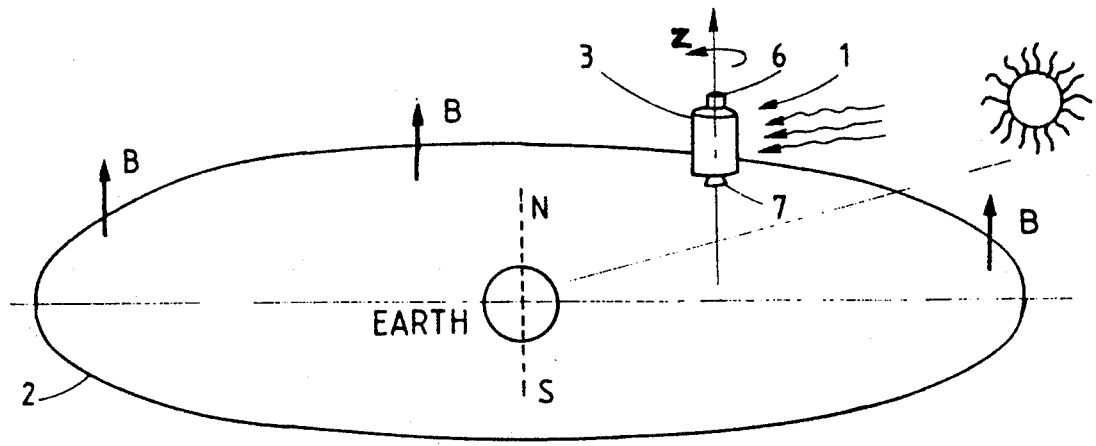
FIG. 1 is a diagram in perspective showing the orbital configuration of a satellite around the Earth.

FIG. 1 shows a spin-stabilized satellite 1 in an equatorial orbit 2 around the Earth which generates a magnetic field $\vec{B}$.

The satellite 1 spins about a main axis Z oriented at least approximately NORTH-SOUTH.

The satellite has a body 3 whose external wall 4 is substantially a cylinder about the axis Z. In this example, the wall has a circular cross-section but it could equally well have, for example, a polygonal cross-section.

Figure 2:
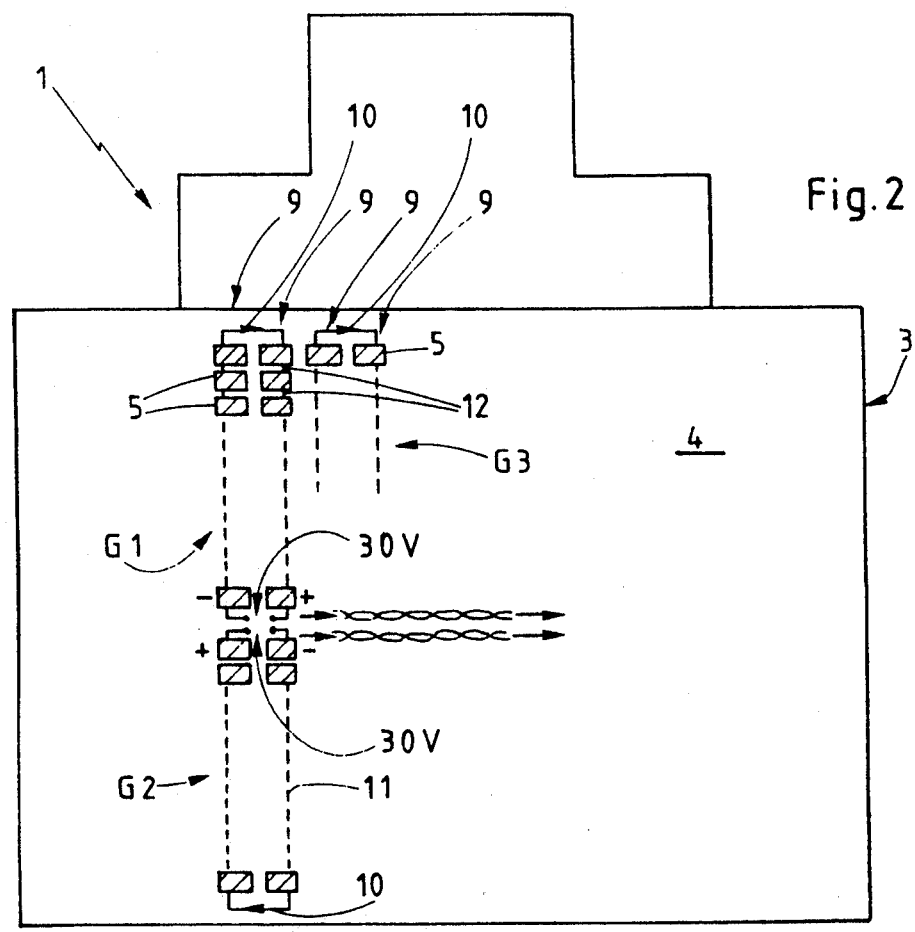
FIG. 2 is a schematic elevational view of the satellite of the present invention.

In the conventional way, the wall 4 is covered with a circumferential plurality of adjacent columns 9 of solar cells 5 arranged to be exposed to solar radiation. The set of solar cells constitutes a solar generator supplying power to various on-board electrical equipment (of any appropriate known type) at a given voltage, a voltage of 30 V, for example. The cells are combined into groups connected in series sufficient to provide the voltage. Three such groups G1, G2, and G3 are shown by way of example. A single voltage is usually sufficient in practice, but different voltages can be produced. Each solar cell is an individual electrical generator of predetermined polarity; only the polarities of the groups of cells are shown in FIG. 2.

According to the invention, the solar cells 5 are wired together to provide the required electrical power, as in the past, and to contribute effectively to the compensation of disturbances due to solar radiation pressure.

The remainder of the structure of the satellite forms no part of the invention and will not be described in more detail. Note that the satellite includes an antenna tower 6 at one end of the body and apogee thruster(s) 7 at the other end and is a satellite of the type described, for example, in French patent application 90-02.367.

Figure 3:
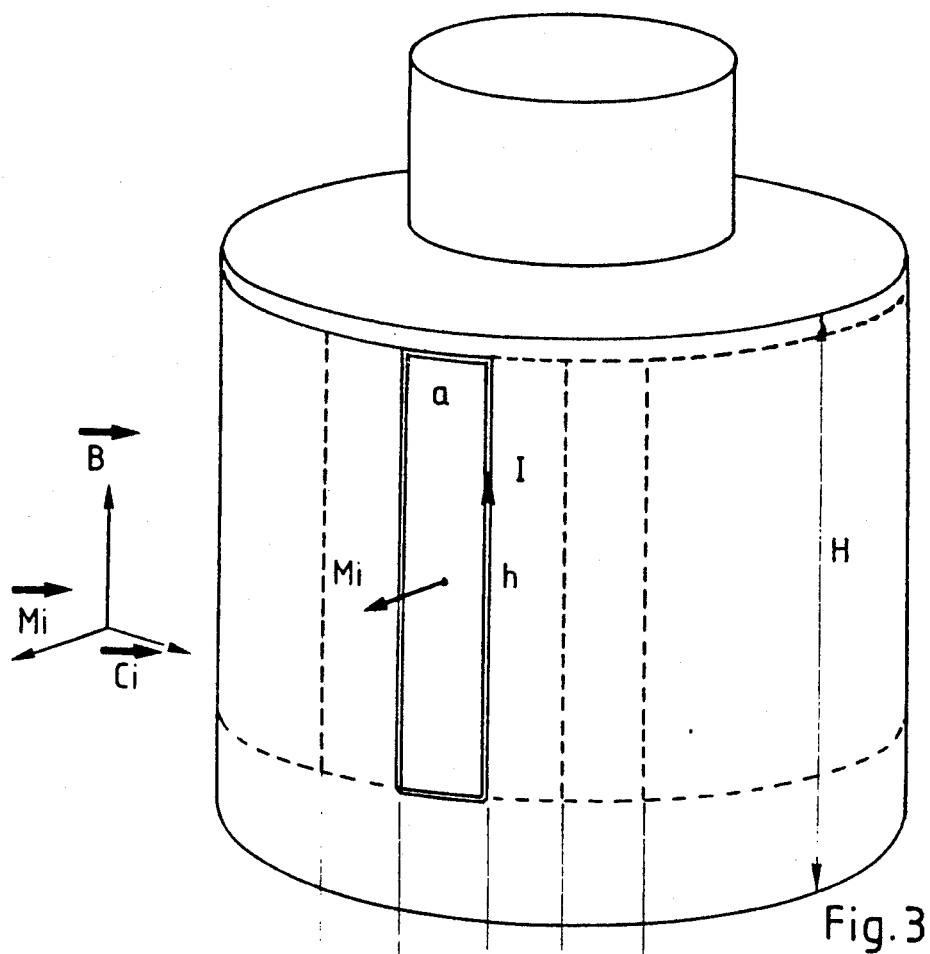
FIG. 3 is a schematic perspective view of the satellite.

With reference to FIG. 3, the invention is based on the interaction of the terrestrial magnetic field B (oriented on a North-South axis like the rotation axis of the satellite) with electrical current loops disposed on the external wall 4 of the satellite body 3 and created entirely by the appropriate wiring of the cells of the solar generator, each group (G1, G2, G3, etc.) having its cells arranged in two columns so as to form a loop, either in isolation or with other groups.

In this example, each loop is formed by two groups defining two U-shapes with their concave sides facing towards each other (ignoring the horizontal sections including the terminals between which the voltage is taken off).

Each current loop i generates, when illuminated, a magnetic moment $\vec{M_i}$ perpendicular to it and, therefore, to the terrestrial magnetic field B. As a result, a torque $\vec{C_i} = \vec{M_i} \wedge \vec{B}$ is exerted on the satellite. Because of the quasi-cylindrical shape of the solar generator and the selective illumination of the loops, the composition of the set of similar loops illuminated determines a magnetic moment $\vec{\mu} = \Sigma \vec{M_i}$ oriented along a satellite-Sun axis and, therefore, a torque $\vec{C} = \Sigma \vec{C_i}$ about the same axis as the disturbing torque $C_0$ due to the solar radiation pressure exerted on all of the satellite. Provided that the loops are dimensioned correctly and positioned appropriately parallel to the Z axis (to the north or to the south of the center of mass, depending on the thermal-optical properties of the external surfaces of the satellite other than the wall 4), it is possible to obtain a compensation torque C' which is in the opposite direction to and advantageously of substantially the same value as the disturbing torque, so compensating the latter throughout the life of the satellite.

To go into more detail, the photovoltaic cells 5 on the quasi-cylindrical external surface or wall 4 of the satellite 1 are wired to provide the voltage needed by the electrical equipment, and additionally to obtain current loops adjacent the periphery of the satellite and of width a and height h (and, therefore, of surface area A = a.h), carrying a current I. The value of the magnetic moment created in each loop, normal to its surface, is:

$$M_i = A. I = a. h. I$$

Because the loops are illuminated selectively depending on the angle between the normal to the plane of each loop and the direction of the incident solar radiation, it can be shown that the resultant of the individual magnetic moments on the wall of diameter D is a moment oriented in the satellite-Sun direction given by the equation $$\mu = \Sigma M_i = (Dh)^2 I_0$$

in which:
$I_0 = p_0/V$,
$P_0$ = electrical power supplied by the solar generator per unit surface area, and
V = nominal operating voltage.

In practice it is necessary to include a coefficient (e) reflecting the efficiency of the wiring (the extent to which the wall 4 is covered by the loops) relative to the ideal wiring (totally contiguous loops):

$$\mu = (Dh)^2 I_0 e$$

The value of e is either less than 1 or greater than 1:
e < 1: separate adjacent loops,
e > 1: interleaved loops.

The value of the coefficient e can be varied by altering the dimensions of and the distance between the solar cells 5 and by altering the circumferential position of the connection wires between the series-connected cells which together constitute the longitudinal runs of the loops.

To compensate the solar radiation pressure torque its average value is determined from the external characteristics of the satellite, i.e., dimensions, thermal-optical coefficients of the surface coverings; the solar constant, power received per unit surface area, typically 1,400 W/m$^2$; and the position of the center of mass along the axis Z.

Further, the wiring of the photovoltaic cells of the solar generator, and, therefore, the values of a and h, are chosen to obtain an average value of the compensating moment $\mu$ equal to the above value.

It is convenient, but not essential, to take h=H, where H is the axial dimension of the wall 4 (this simplifies the wiring), and the number of cells is advantageously chosen so that connecting them in series along the height H, and, therefore, along two half-columns, produces the required voltage V.

It will be noted that the difference between the compensating moment and the compensating torque is represented by a simple vector multiplication by $\vec{B}$.

The two opposing torques are subject to seasonal variations relating to the variation in the solar elevation angle (the angle between the direction of the solar flux and the plane of the orbit), here denoted $\alpha_s$. Where the body 3 of the satellite is concerned (supporting the solar generator), the variation in the solar radiation pressure is analogous to that of the compensating torque (proportional to cos $\alpha_s$). These variations are, therefore, substantially self-compensating. The contribution of the other external surfaces to the disturbing torque is usually substantially less (zero angle of solar incidence for the transverse surfaces and small sizes of vertical parts outside the solar generator).

The proposed system has been applied to a satellite which has a cylindrical main body 3.2 m in diameter and 2.3 m high, and a cylindrical antenna tower of smaller diameter and 1.1 m high, as shown in FIG. 2.

Figure 4:
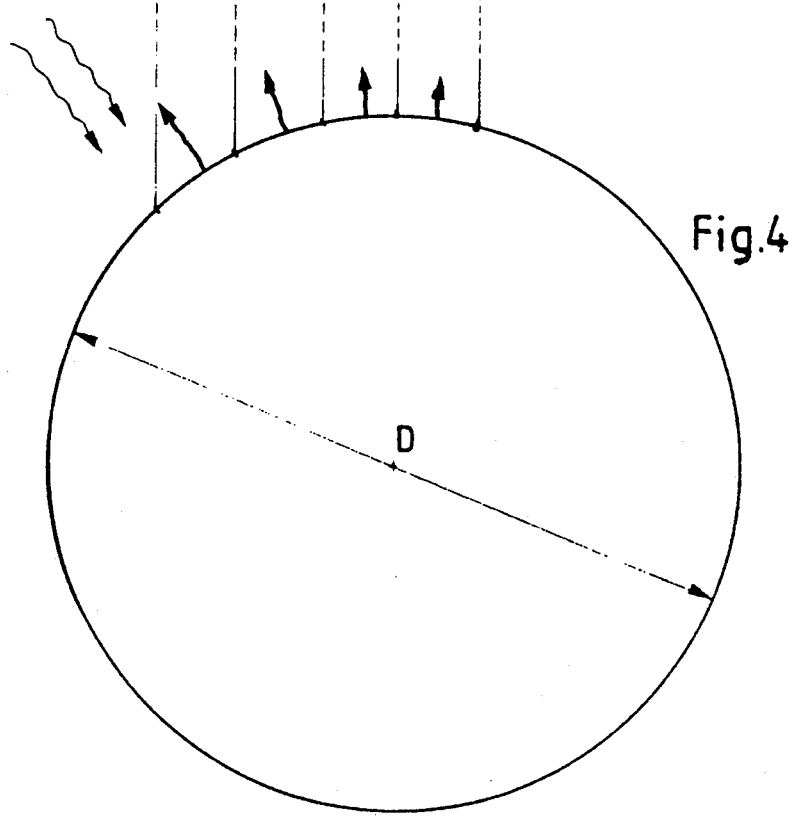
FIG. 4 is a schematic transverse cross-sectional view of the satellite depicted in FIG. 3.

The level of the disturbing torque $C_0$ due to the solar radiation pressure exerted on the satellite has been simulated (see FIG. 4) and a mean value in the order of $15.10^{-6}$ $\mu$Nm (micro Newton meters) was obtained. Given the foregoing general description, the general principles of the simulation will be evident to those skilled in the art and need not be described in detail.

The cylindrical body 3 is covered with back surface reflector (BSR) type photovoltaic cells each generating 454 mV at the start of their life and approximately 425 mV at the end of the satellite life (seven years).

The equipments require a supply voltage of 28 V, meaning around 30 V at the solar generator terminals. This voltage is provided by connecting 71 cells in series.

Of the 2.3 m height of the cylindrical body 2.25 m is occupied by the cells. Each cell has a height of 30 mm, allowing a gap between cells of 0.7 mm. The cell width is taken as 50 mm, all these values being typical for cells of this kind.

As already mentioned above, the wiring preferably connects in series two vertical half-rows, so forming one current loop per vertical section as best shown in FIG. 2; a plurality of loops per vertical section would be equally valid.

A loop formed by a single group is also feasible, yielding a cell height of 60 mm. Note that the format of the solar cells 5 and the locations of the connecting leads on the cells can be chosen at will, as these devices are usually manufactured to special order.

It will be noted that the columns 9 are arranged in pairs, the two columns of each pair being electrically connected by an even number of electrical connections carrying currents in opposite directions, these pairs having equal dimensions transversely to the axis.

With the numerical values given, and assuming a value of $P_0 = 105$ W/m$^2$ (end of satellite life, equinox), a maximum value of the compensating torque $C_1$ (totally contiguous loops) of $18.10^{-6}$ $\mu$Nm is obtained ($C'_1$ in FIG. 6).

In that the mean torque to be compensated is $15.10^{-6}$ $\mu$Nm, an efficiency factor e of 83% is used for the wiring of the horizontal portions. To achieve this the connecting leads are disposed so that transverse runs 10, illustrated in FIG. 2, account for 83% of the width of a pair of adjacent cells, with longitudinal runs 11 formed by a series of connecting sections 12 being parallel to the axis Z, of course; the value of the coefficient e is then determined by the distance between the longitudinal runs 11 of a loop, that is to say by the length of the transverse runs 10.

FIG. 6 shows the level of the residual torque $C_T$ after compensation is applied. This is reduced by at least a factor of 10.

It goes without saying that the foregoing description has been given by way of non-limiting example only and that numerous variations can be proposed by those skilled in the art without departing from the scope of the invention. For example, a value for the coefficient e > 1 can be achieved by interleaving the loops, for example by not connecting two adjacent columns of cells but two columns separated by at least one column of cells which forms part of another loop.

An optimum version of the invention capable of compensating virtually all disturbances due to solar radiation pressure has been described above. The invention naturally covers rather more rudimentary embodiments in which the looped arrangement of the cells would compensate for only part of the disturbances. It is within the competence of those skilled in the art to determine, on the basis of the distribution of masses and the geometry of the satellite in question and the thermal-optical properties of its external surfaces, in which direction the current should flow in the current loops.

It will be understood that, rather than alternating the value of the coefficient e, it is possible to have the current in some loops flow in the reverse direction to that for most other loops.

There are also various ways to distribute cells between loops, for example, long vertical loops laterally adjacent as discussed previously, a succession of loops parallel to the NORTH-SOUTH axis, or even a quincunx arrangement. However, it is preferable that the external wall 4 should be virtually entirely covered with loops.

What is claimed is:

1. A satellite adapted to have its attitude in a terrestrial orbit stabilized by spinning about an axis oriented approximately in a north-south direction, said satellite comprising:

a satellite body having a generally cylindrical external wall coaxial with said axis; and a solar electrical generator for generating electrical power for said satellite having a predetermined voltage, said solar electrical generator having a plurality of columns of solar cells carried by said generally cylindrical external wall, each column of said plurality of columns being parallel to said axis and said plurality of columns being disposed all around the circumference of said generally cylindrical external wall, said plurality of columns being selectively combined to form a plurality of pairs of columns, said solar cells in each of said pair of columns forming at least one group of solar cells, at least one end of one column of said pair of columns being connected to an adjacent end of the other column of said pair of columns by a first electrical connection in a direction transverse to said axis, said solar cells in said at least one group of solar cells being serially connected so that said at least one group of solar cells forms a discontinuous electrical loop, said discontinuous loop having an electric current flowing in a predetermined rotational direction through said discontinuous electrical loop when said at least one group of solar cells is illuminated, said rotational direction of said current in said discontinuous electrical loop being selected so that said current flow in each said discontinuous electrical loop being illuminated interacts with the terrestrial magnetic field to produce a compensating torque about an instantaneous transverse axis of said satellite in a direction opposite to the torque exerted on said satellite by solar radiation pressure about said transverse axis.

2. The satellite of claim 1 wherein said solar cells in each said column of each said pair of columns are divided to form two groups of solar cells, each group of solar cells having a selected number of serially connected solar cells from each said column and wherein the ends of each column of said pair of columns opposite said ends connected together by said first electrical connection are connected to each other by a second electrical connection transverse to said axis, such that each group of solar cells of said two groups of solar cells forms a discontinuous electrical loop having a current flow in said rotational direction.

3. The satellite of claim 2 wherein each said group of said two groups of solar cells comprises one half of said solar cells in each column of said pair of columns.

4. The satellite of claim 1 wherein each pair of columns of said plurality of pairs of columns comprises adjacent columns.

5. The satellite of claim 1 wherein the columns of a first pair of columns of said plurality of columns are separated by at least one other column of solar cells of at least a second pair of columns, and wherein said discontinuous electrical loop formed by a first pair of columns is interleaved with at least one electrical loop formed by at least a second pair of columns.

6. The satellite of claim 1 wherein said selectively combined columns which form said plurality of pairs of columns comprises a majority of said solar cells.

7. The satellite of claim 6 wherein said majority of said columns of solar cells comprises at least three fourths of said solar cells.

8. The satellite of claim 6 wherein said majority of said columns of said solar cells comprises at least nine tenths of said solar cells.

9. The satellite of claim 1 wherein said columns of solar cells extend over substantially the axial length of said external wall.

10. The satellite of claim 1 wherein said current flow in a majority of said discontinuous electrical loops formed by said plurality of pairs of columns of solar cells is in said predetermined rotational direction.

11. The satellite of claim 10 wherein said majority of said discontinuous electrical loops comprises at least three fourths of said discontinuous loops.

12. The satellite of claim 10 wherein said majority of said discontinuous electrical loops comprises nine tenths of said discontinuous electrical loops.

13. A solar cell arrangement for a satellite having a generally cylindrical external surface, said satellite adapted to have its attitude in a terrestrial orbit stabilized by spinning about an axis concentric with said generally cylindrical external surface, said axis oriented substantially in a direction parallel to the magnetic poles of the terrestrial body about which it is orbiting, said solar cell arrangement comprising:

a plurality of columns of solar cells carried by said generally cylindrical external surface, each column of said plurality of columns of solar cells being disposed parallel to said axis, said plurality of columns of solar cells being disposed all around the circumference of said generally cylindrical external surface, selected pairs of columns of said plurality of columns being combined to form a plurality of selected pairs of columns, said solar cells in each selected pair of columns forming at least one group of solar cells, at least one end of one column of each selected pair of columns being connected to an adjacent end of the other column of said selected pair of columns by a first electrical connection disposed in a direction transverse to said axis, said solar cells in said at least one group of solar cells being serially connected and in conjunction with said first electrical connection form a discontinuous electrical loop, said discontinuous electrical loop having an electric current flowing in a predetermined rotational direction in said discontinuous electrical loop when said group of solar cells are illuminated, said predetermined rotational direction being selected so that said current flow interacts with the terrestrial magnetic field generated between the magnetic poles of the terrestrial body to produce a compensating torque exerted on said satellite about a transverse axis of said satellite in a direction opposite the torque exerted upon said satellite by solar radiation pressure.

14. The solar cell arrangement of claim 13 wherein said solar cells in each of said selected pairs of columns are divided to form two groups of solar cells, each group of solar cells having a predetermined number of serially connected solar cells selected from each column of said selected pair of solar cells and wherein the ends of each column of said selected pair of columns, opposite the ends connected together by said first electrical connection, are connected to each other by a second electrical connection transverse to said axis, each group of solar cells of said two groups of solar cells forming a discontinuous electrical loop having a current flow in said predetermined rotational direction when said solar cells in said two groups of solar cells are illuminated.

15. The solar cell arrangement of claim 14 wherein the number of solar cells in each said group of solar cells are equal and comprise one half of the solar cells in each column.

16. The solar cell arrangement of claim 13 wherein said plurality of selected pairs of columns comprise a majority of said plurality of columns.

17. The solar cell arrangement of claim 13 wherein said current flow in a majority of said discontinuous electrical loops formed by said plurality of selected pairs of columns is in said predetermined rotational direction.

18. The solar cell arrangement of claim 13 wherein each said selected pair of columns comprises two adjacent columns of solar cells.

19. The solar cell arrangement of claim 13 wherein the columns of solar cells in a first selected pair of columns are separated from each other by at least one column of solar cells of a second selected pair of columns and wherein said discontinuous electrical loop formed by said first selected pair of columns is interleaved with the electrical loop formed by said second selected pair of columns.

* * * * *

UNITED STATES PATENT AND TRADEMARK OFFICE
CERTIFICATE OF CORRECTION

PATENT NO. : 5,158,250
DATED : October 27, 1992
INVENTOR(S) : Alain Reboux

It is certified that error appears in the above-identified patent and that said Letters Patent is hereby corrected as shown below:

Column 3, line 63, delete "B" and insert ---- $\vec{B}$ ----.

Column 4, line 12, delete "B" and insert ---- $\vec{B}$ ----.

Signed and Sealed this

Ninth Day of November, 1993

Attest:

BRUCE LEHMAN

*Attesting Officer*   *Commissioner of Patents and Trademarks*